United States Patent Office 3,182,488
Patented May 11, 1965

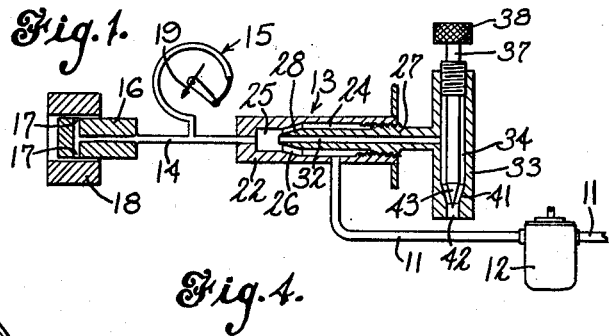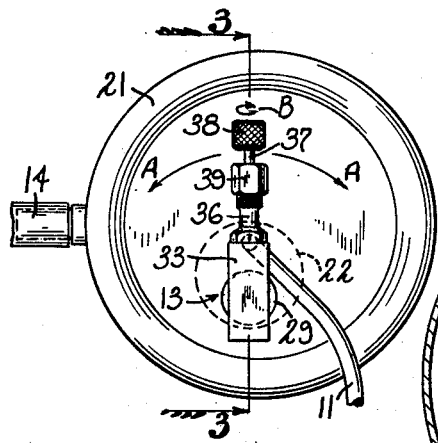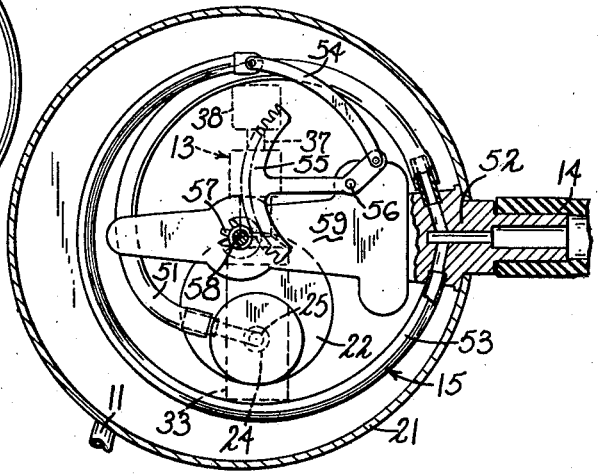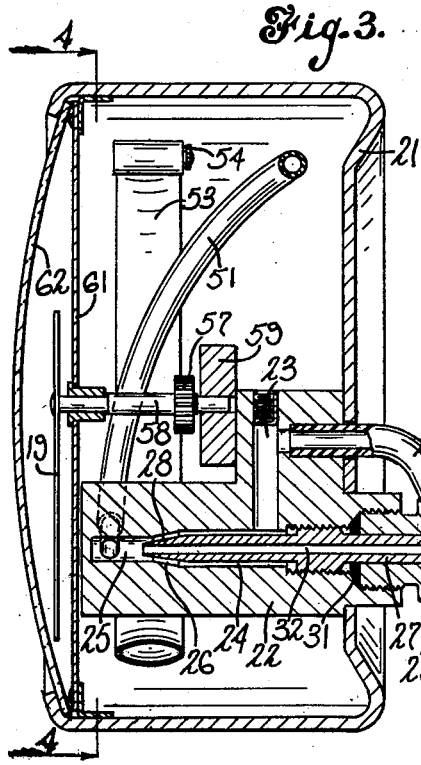

3,182,488
FLUID GAGE ADJUSTING UNIT
Allen R. Hollister, East Hartford, Conn., assignor to Pratt & Whitney Inc., a corporation of Delaware
Filed Oct. 24, 1962, Ser. No. 232,776
7 Claims. (Cl. 73—37.5)

This invention relates to fluid gages useful in measuring dimensions or variations of a part and is more specifically directed to a compact unit for both zeroing a gage and adjusting the sensitivity thereof.

Fluid gages provided with means for adjusting the sensitivity and zeroing the gages are known in the art and add flexibility to a gage. A fluid gage is normally provided with a nozzle from which a fluid such as air escapes in contact with the surface of the workpiece being measured. Gages of this type normally fall into two different categories, a back pressure gage and a flow gage. In the back pressure gage, a Bourdon-type gage is tapped into the line between a restriction and the nozzle, the restriction being fed by a constant pressure source. Variations in back pressure resulting from the proximity of the nozzle to the surface being measured cause fluctuations in the Bourdon gage readings. In contradistinction, in the flow gage, a flow meter is placed in series with the nozzle and the fluid escaping from the nozzle first passes through the flowmeter. Usually, a pointer or indicator in the flowmeter tube is supported by the column of fluid passing therethrough and the height to which the indicator is supported is responsive to the flow from the nozzle, which again depends upon the proximity of the nozzle to the surface being measured. In either case, the sensitivity of the gage would depend upon the change in flow at the nozzle as a percentage of the fluid flowing in the line. In other words, a small change in fluid flowing from the nozzle would effect a greater change in back pressure and therefore greater sensitivity if a small volume of fluid was flowing in the line than if a large volume of fluid was flowing in the line. Thus, by regulating the flow in the line, the sensitivity of the gage may be adjusted.

Gages of this type are usually provided with means for changing the nozzles for different applications, and one nozzle in free surroundings may cause a difference in back pressure over another nozzle of a different type or similar nozzles having different nozzle apertures. It is therefore desirable to provide means to adjust or relieve some or all of the back pressure caused by the nozzle and this may readily be accomplished by bleeding-off to atmosphere some of the fluid in the line, thereby providing means for zeroing the gage.

Accordingly, it is a primary object of this invention to provide means for setting the zero and adjusting the sensitivity of a fluid gage which may be quickly and efficiently operated.

Another object of the invention is to provide a compact or portable air gage having zero setting and sensitivity adjustments, which may be set by the operator using one hand only, leaving the other hand free to hold or manipulate the gage plug.

Still other objects and advantages of the invention will in part be obvious and will in part be apparent from the specification.

Generally speaking, in accordance with the invention, a unit is provided with two valves which communicate one with another. The unit is in series with the regulator for the air supply and the indicator gage and is positioned therebetween to provide for adjustment of both the sensitivity and the zero position. The unit is so constructed that rotation of a stem in one plane regulates the sensitivity while rotation of a knob on the stem in another plane effects the zero adjustment. The juxtaposition of the stem with relation to the knob is such that the operator, with one hand, can manipulate both the sensitivity and zero adjustment features, concurrently if he so desires, leaving the other hand free to manipulate the gage plug.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawing, in which:

FIG. 1 is a schematic representation of an air gage measuring system showing the sensitivity and zero adjustment mechanism of the invention with relation to the other elements of the system;

FIG. 2 is a rear elevational view of a Bourdon-type gage to which the mechanism may be mounted;

FIG. 3 is a sectional view taken along line 3—3 of FIG. 2 and showing the gage and adjusting mechanism of the invention in greater detail; and FIG. 4 is a sectional view taken along line 4—4 of FIG. 3.

While the drawings disclose the mechanism mounted to a Bourdon-type or back pressure gage, it should be understood that the invention is not limited to such use, but is equally adaptable for use with other types of fluid-gaging apparatus such as flow gages and the like. While the fluid used in gaging is normally air, it will be understood that any type of fluid may be used and the invention is not limited to use with any particular fluid.

Referring now to FIG. 1, an air supply line 11 brings air under pressure from a source (not shown) through a pressure regulator 12 to the adjusting mechanism shown generally at 13. The fluid or air is delivered from adjusting mechanism 13 by means of a line 14 past a Bourdon gage 15 to a gaging plug 16. Gaging plug 16 is provided with nozzles 17. The particular type of gaging plug schematically represented in FIG. 1 is adapted to gage the internal surface of a workpiece 18. However, it will be readily understood that any type of gaging plug may be attached to the end of line 14 to perform the gaging operation desired. Bourdon gage 15 is provided with a pointer 19 which will register variations in back pressure as will hereinafter be described.

Referring more specifically to FIGS. 2–4, according to a preferred embodiment of the invention, adjusting mechanism 13 is shown in the body of a Bourdon gage so that the unit may be mounted on a bench or easily transported. To set up, the unit requires only attachment to a regulated supply line by means of air supply line 11 while any desired gaging plug 16 is secured to the end of line 14 which may, if desired, be a flexible tube.

Within Bourdon gage casing 21 is mounted a main block 22 having a passage 23 which communicates with air supply line 11 attached to the main block. Passage 23 communicates with a cylindrical chamber 24 having an end portion 25 thereof of smaller diameter joined to the main portion by a tapered section forming a valve seat 26. A stem 27 threadedly engages main block 22 and is received in cylindrical chamber 24. The end 28 of stem 27 adjacent valve seat 26 is also tapered, thereby forming a valve between cylindrical chamber 24 and the end portion 25 thereof. A collar 29 also threadedly engages main block 22 and slidably receives stem 27 to limit the actual movement of the stem. A packing 31 held by collar 29 seals the circumference of the stem thus preventing any escape of air along the stem and from the collar.

Stem 27 is also provided with a passage 32 which extends axially the entire length of the stem. To the outer end of stem 27 is secured a bleed block 33 provided with a chamber 34. Passage 32 communicates with chamber 34, with a seal 35 being provided between the stem and the bleed block to prevent the escape of air from around the connection. The other end of passage 32 communicates with the end portion 25 of the cylindrical chamber.

A collar 36 is threadedly engaged in bleed block 33 and threadedly engaging the collar is a needle valve stem 37 provided with a knurled knob 38 at the outer end thereof. A sleeve and packing assembly 39 prevents the escape of air between the needle valve stem and the collar 36. Chamber 34 tapers at 41 to an outlet passage 42 which communicates with the atmosphere. The inner end 43 of needle valve stem 37 tapers and, with the tapered portion of chamber 34, forms a valve. It will thus be seen that rotation of bleed block 33 in the direction indicated by the arrows A—A in FIG. 2 causes the valve in chamber 24 to be opened or closed while rotation of knurled knob 38 in the directions shown by the arrow B in FIG. 2 effects an opening or closing of the valve in bleed block 33.

To the end portion 25 is connected an outlet tube 51 the other end of which is connected to a Y-connection 52 secured to the Bourdon gage casing. To the second leg of Y-connection 52 is connected line 14 while the remaining end is connected to a flexible tube 53 forming part of the Bourdon gage. As is usual with gages of this type, the other end of flexible tube 53 is closed and is pivoted to a link 54 which is, in turn, pivoted to a gear segment 55. Gear segment 55 is pivotally mounted at 56 to the gage casing or other suitable member and the gear portion thereof engages a gear 57 secured to a shaft 58. Shaft 58 may be journaled in a support block 59 secured to the main block or gage facing, and in the dial 61 carried by the casing. Dial 61 may be graduated in increments as desired. The outer end of shaft 58 carries pointer 19 adapted to sweep across the face of the dial. A dial cover 62 may be provided and suitably secured over the face of the dial.

In operation, air supply line 11 is connected to a pressure regulator 12 and air under pressure flows through the supply line and through passage 23 into cylindrical chamber 24. The air thereupon flows through the valve formed by portions 26 and 28 and into end portion 25. From end portion 25, the air flows through outlet tube 51 and divides in the Y-connection 52. Some of the air under pressure tends to expand flexible tube 53 thereby causing it to straighten a small amount and rotate gear segment 55 through link 54. The rotation of gear segment 55 rotates gear 57 thereby causing a deflection of pointer 19. The remainder of the fluid under pressure at Y-connection 52 flows through line 14 to a gaging plug 16 which is brought into contact with the workpiece 18 being measured. Variations in size of the workpiece cause the spacing between the nozzles and the workpiece surfaces to vary, thereby reducing or increasing the flow of air from the nozzles. The change in flow causes a change in back pressure in line 14, thereby changing the back pressure in flexible tube 53. It is evident that the deflection of pointer 19 moves in response to the changes of pressure in flexible tube 53. The amount of air that may flow from passage 23 to end portion 25 is controlled by the valve formed by portions 26 and 28. By threading stem 27 further into chamber 24, the amount of flow through the valve is reduced thereby increasing the sensitivity of the gage. Conversely, the sensitivity may be reduced by opening the valve formed between portions 26 and 28. Stem 27 is rotated by manually rotating bleed block 33 and the members 36, 39, etc., extending therefrom as shown in FIG. 2. It should be noted that the valve formed by portions 26 and 28 forms a restriction in the line. As is known in the art, this restriction isolates the Bourdon gage from the regulator. Without the restriction, the Bourdon gage would read the pressure at the regulator, not the back pressure.

A bleed from end portion 25 is provided by means of passage 32 which communicates with chamber 34 in the bleed block. When a gaging plug 16 is attached to the end of line 14, a reading plus or minus of zero may result on the Bourdon gage. By rotating knurled knob 38, the needle valve in bleed block 33 is adjusted to adjust the amount of air allowed to be bled to atmosphere through outlet passage 42. If a plus reading is shown on the gage when the gaging plug is in free air, the pressure in end portion 25 must be reduced by opening the valve in bleed block 33. If a minus reading is obtained, the pressure must be increased by closing the valve until a zero reading is attained.

It is thus seen that an operator, by placing his hand on knurled knob 38, can easily effect sensitivity adjustment by swinging the knurled knob through an arc about stem 27 and can effect a zero setting by rotating knurled knob 38 about the axis of needle valve stem 37. These operations can be performed concurrently or consecutively, as the operator may desire.

The mechanism shown herein is particularly adapted for use on a bench model or portable type of air gage which may be moved from place to place and quickly adapted to the requirements of many jobs. It may also be mounted for a stationary installation. Furthermore, the mode of combining the sensitivity and zero adjustment features is not limited for use with the Bourdon type gage such as disclosed in the drawings, but may be used as well with flow-type gages.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In combination with a pressure regulator, a fluid gage and a gaging plug, means for adjusting the sensitivity and setting the zero of the gage comprising a first chamber having an inlet and an outlet, said inlet communicating with the pressure regulator, said outlet communicating with the fluid gage which communicates with the gaging plug, a first valve in said first chamber for controlling the flow between said inlet and said outlet, means for adjusting said first valve, a second chamber having an inlet and an outlet, a passage communicating with the outlet side of said first valve and the inlet of said second chamber through said means for adjusting the first valve, a second valve in said second chamber for controlling the flow between said inlet and said outlet, and means for adjusting said second valve.

2. In combination, a back pressure gage, a pressure regulated source of fluid, means for adjusting the sensitivity and setting the zero of said gage comprising a first chamber having an inlet and an outlet, said inlet communicating with the pressure-regulated source of fluid, said outlet communicating with a fluid gage controlled in response to the changes in flow from a gaging plug, a first valve in said first chamber for controlling the flow between said inlet and said outlet, means for adjusting said first valve, a second chamber coupled to said adjusting means and having an inlet and an outlet, a passage communicating with the outlet side of said first valve and the inlet side of said second chamber through said means for adjusting the first valve, a second valve in said second chamber for controlling the flow between said inlet and said outlet, and means for adjusting said second valve.

3. In combination with a pressure regulator, a fluid gage and a gaging plug, means for adjusting the sensitivity and setting the zero of the gage comprising a first chamber having an inlet and an outlet, said inlet communicating with the pressure regulator, said outlet communicating with the fluid gage which is responsive to the changes in flow from the gaging plug, a first valve in said first chamber for controlling the flow between said inlet and said outlet, means for adjusting said first valve, a second chamber coupled to said adjusting means, and having an inlet and an outlet to atmosphere, a passage in said adjusting means communicating with the outlet side of said first valve and the inlet of said second chamber, a second valve in said second chamber for controlling the flow between said inlet and said outlet, and means for adjusting said second valve, said means for adjusting said first and second valves rotatable in cross-axial planes with respect to each other.

4. The structure defined in claim 3 wherein said first chamber comprises a main block having a cylindrical chamber therein communicating with said inlet and a second cylindrical chamber of smaller diameter communicating with said outlet, said first and second cylindrical chambers being axially disposed and communicating with one another by means of a tapered chamber forming a valve seat, and said means for adjusting said first valve comprises a valve stem having a tapered valve end thereon adapted to engage said valve seat between said cylindrical chambers, said valve stem threadedly engaged in said main block and adapted to be rotated to selectively open and close said first valve.

5. The structure defined in claim 4 wherein said second chamber is mounted to said valve stem for movement therewith and said passage extends axially through said valve stem.

6. The structure defined in claim 5 wherein said second chamber is defined by a bleed block mounted to the end of said valve stem and said means for adjusting said second valve comprises a needle valve stem threadedly engaging said bleed block and entering said second chamber, said needle valve stem having a tapered valve portion extending into the juncture between said second chamber and said outlet to control the flow of fluid from said second chamber to the atmosphere through said outlet, said needle valve stem adapted to be rotated to adjust the effective area of communication between said second chamber and said outlet.

7. In combination, a source of fluid under regulated pressure, a fluid gaging plug, a back pressure fluid gage, a first valve chamber having inlet and outlet passages, said inlet passage coupled to said regulator and said outlet passage coupled to said plug, said gage coupled intermediate said plug and said outlet passage to indicate a change in back pressure of fluid passing between said outlet passage and said plug, a first valve stem threadedly mounted in said first chamber and providing in combination with said chamber a fluid restriction between said inlet and outlet passages, a second valve chamber coupled to said first stem having an inlet passage and an atmospheric outlet passage, said first stem having a fluid passage therethrough which extends at one end to the outlet passage side of the restriction in said first valve chamber and extends at its other end to the inlet passage of said second chamber, and a second stem threadedly mounted in said second chamber for controlling the flow of fluid in order to atmospherically bleed said gage, thereby zeroing said gage, said second valve chamber being coupled to said first stem such that rotation of said second chamber adjusts the axial position of said first stem within said first chamber to control the sensitivity of said gage and said second stem being mounted for motion within said second chamber cross-axially to the movement of said first stem in said first chamber.

References Cited by the Examiner
UNITED STATES PATENTS

| 2,970,822 | 2/61 | Ernest | 137—608 |
| 3,056,280 | 10/62 | Brewer | 73—37.5 |

ISAAC LISANN, *Primary Examiner.*